(12) United States Patent
Viano (10) Patent No.: US 10,723,251 B2
(45) Date of Patent: Jul. 28, 2020

(54) PELVIC RESTRAINING STRAP

(71) Applicant: INSTITUTE FOR INJURY RESEARCH, Bloomfield Hills, MI (US)

(72) Inventor: David C. Viano, Bloomfield Hills, MI (US)

(73) Assignee: INSTITUTE FOR INJURY RESEARCH, Bloomfield Hills, MI (US)

(*) Notice: Subject to any disclaimer, the term of this patent is extended or adjusted under 35 U.S.C. 154(b) by 35 days.

(21) Appl. No.: 16/115,304

(22) Filed: Aug. 28, 2018

(65) Prior Publication Data
US 2020/0070704 A1 Mar. 5, 2020

(51) Int. Cl.
*B60N 2/42* (2006.01)
*B60N 2/90* (2018.01)
(52) U.S. Cl.
CPC .............. *B60N 2/99* (2018.02); *B60N 2/42* (2013.01)
(58) Field of Classification Search
CPC .................................. B60N 2/99; B60N 2/42
USPC ....................................................... 297/216.1
See application file for complete search history.

(56) References Cited

U.S. PATENT DOCUMENTS

| | | | | |
|---|---|---|---|---|
| 4,790,597 A * | 12/1988 | Bauer | ................... | B60R 22/26 248/429 |
| 5,020,856 A * | 6/1991 | George | ................... | B60R 22/18 280/801.1 |
| 5,120,103 A * | 6/1992 | Kave | ................... | B60N 2/0715 248/429 |
| 2006/0042850 A1* | 3/2006 | Mendis | ............... | B60R 22/1951 180/268 |
| 2010/0059980 A1* | 3/2010 | Wang | ................... | B60R 22/023 280/808 |
| 2014/0167400 A1* | 6/2014 | Jenny | ................... | B60R 22/1955 280/801.1 |
| 2015/0054321 A1* | 2/2015 | Hirako | ................. | B60N 2/4221 297/216.1 |
| 2015/0217720 A1* | 8/2015 | Palaniappan | ........... | B60R 22/18 280/804 |
| 2017/0096121 A1* | 4/2017 | Krishnamurty | ....... | B60R 22/023 |
| 2019/0106079 A1* | 4/2019 | Ohno | ................... | B60R 22/023 |
| 2019/0225185 A1* | 7/2019 | Ohno | ................... | B60N 2/0705 |
| 2019/0291685 A1* | 9/2019 | Ohno | ................... | B60R 22/023 |

\* cited by examiner

*Primary Examiner* — Mark R Wendell
(74) *Attorney, Agent, or Firm* — Cantor Colburn LLP (57) ABSTRACT

A vehicle seat that includes a cushion frame, a seatback frame, and a pelvic restraining strap or a restraining member. The cushion frame is connected to the vehicle floor and has a first side member and a second side member that is disposed opposite to the first side member. The seatback frame is connected to the cushion frame. The pelvic restraining strap or the restraining member is connected to the cushion frame and extends towards and may or may not connect to the seatback frame.

17 Claims, 6 Drawing Sheets

PELVIC RESTRAINING STRAP

BACKGROUND

Vehicle seats and seat belts may be designed to protect an occupant during a vehicle impact such as a frontal impact or a rear impact. A rear vehicle impact presents occupant protection challenges especially should the vehicle seat incorporate a recliner feature. Some attempts to address these challenges include strengthening the recliner feature or strengthening the vehicle seat.

Modern seats may include a perimeter frame and a pelvic catcher that allows a seat occupant to pocket into the seatback, such as in U.S. Pat. No. 5,509,716. These seats may commonly be referred to as high retention seats having a pelvic catcher (e.g. pelvic strap), which is connected to a seatback frame to support the occupant's pelvis and lower torso in a rear impact. Such pelvic straps may be regarded as first generation pelvic straps. High retention seats may allow the seatback to yield rearward and may gradually accelerate an occupant in a rear impact. The pocketing of the occupant improves retention of the occupant on the seat. However, in severe rear impacts or crashes with heavy occupants, the seatback rotation rearward may allow the occupant to move up the seatback even with the lap-shoulder belt buckled.

SUMMARY

Disclosed is a vehicle seat that includes a cushion frame, a seatback frame and a pelvic restraining strap. The cushion frame is connected to the vehicle floor and has a first side member and a second side member that is disposed opposite to the first side member. The seatback frame is connected to the cushion frame. The pelvic restraining strap has a first strap end connected to at least one of the first side member of the cushion frame and the vehicle floor, a second strap end connected to at least one of the second side member of the cushion frame and the vehicle floor, and a strap body extending between the first strap end and the second strap end. The pelvic restraining strap is arranged to wrap around a portion of at least one of a seated occupant's pelvis and torso.

Also disclosed is a vehicle seat that includes a cushion frame, a seatback frame and a restraining member. The cushion frame has a first side member and a second side member. The seatback frame is connected to the cushion frame. The restraining member has a first end connected to at least one of the first side member and a vehicle floor, a second end connected to at least one of the second side member and the vehicle floor, and a restraining member body connected to the first end and the second end, the restraining member body extending into the seatback frame.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The present disclosure relates to an automotive vehicle seat and rear vehicle impact safety. In a rear vehicle impact, the vehicle seat may accelerate a seat occupant up to the change in velocity (delta V or $\Delta V$) of the vehicle impact. The vehicle seatback transfers energy to the occupant according to $E=\frac{1}{2} m(\Delta V)^2$, where m is the mass of the occupant and $\Delta V$ is the change in velocity of the crash. With modern seats, about 60% of the occupant's weight interacts with the seatback in a rear impact.

The energy transfer capability of a vehicle seat is measured by loading a crash test dummy rearward into the seat using a QST procedure (See Viano D C, Role of the Seat in Rear Crash Safety. SAE Book, ISBN 0-7680-0847-6, Society of Automotive Engineers, Warrendale, Pa., SAE R-317: 1-491, 2002). The energy transfer capability is measured as the seatback rotates rearward from the design position of nominally 20 deg to 60 deg rearward of vertical. QST testing of seats has shown that the energy transfer capability of seats is proportional to the moment strength (M), where $M=F*z$, and F is the peak load and z is the distance from the occupant's H-point to the center of loading (See Viano D C. High Retention Seat Performance in Quasistatic Seat Tests. SAE 2003-01-0173, Society of Automotive Engineers, Warrendale, Pa., 2003). The relationship between energy transfer capability and moment strength of the seat is $E=0.098*M$, where E is reported in ft-lb and M in in-lb and the coefficient is a best-fit to QST data on seats.

Modern, vehicle seats in automobiles have moment strength of 15,000-25,000 in-lb or more and provide an energy transfer capability of 1,470-2,450 ft-lb or more (See Viano D C, White S. Seat Strength in Rear Body Block Tests. Traffic Injury Prevention, 17:5:502-507, 2016). Some seats include the seatbelts integrated into the seat, called ABTS (all belts to seat). They are stronger than conventional seats because they support seatbelt loads in frontal crashes. They are heavier and stiffer than conventional seats and may increase injury risks in low-to-moderate speed rear impacts (See Viano D C, Parenteau C S.; BioRID Dummy Responses in Matched ABTS and Conventional Seat Tests on the IIHS Rear Sled. Traffic Injury Prevention 12:339-346, 2011). ABTS have moment strength of 22,000-35,000 in-lb or more and provide energy transfer capability of 2,156-3,430 ft-lb or more.

TABLE 1

Crash delta V related to seat energy transfer capability and occupant weight.

| | | \multicolumn{6}{c}{Moment Strength (inlb)} | | | | | |
|---|---|---|---|---|---|---|---|
| | | 7,500 | 15,000 | 22,500 | 30,000 | 37,600 | 45,000 |
| | | \multicolumn{6}{c}{Seat Energy Transfer Capability (ftlb)} | | | | | |
| | | 737 | 1,474 | 2,211 | 2,948 | 3,685 | 4,422 |
| Hybrid III | Weight (lb) | \multicolumn{6}{c}{Delta V (mph)} | | | | | |
| 3 yo | 31.9 | 33.9 | 48.0 | 58.8 | 67.8 | 75.8 | 83.1 |
| 6 yo | 45.9 | 28.3 | 40.0 | 49.0 | 56.6 | 63.2 | 69.3 |
| 10 yo | 71.3 | 22.7 | 32.1 | 39.3 | 45.4 | 50.7 | 55.6 |
| 5th female | 102.8 | 18.9 | 26.7 | 32.7 | 37.8 | 42.3 | 46.3 |
| 50th male | 172.0 | 14.6 | 20.7 | 25.3 | 29.2 | 32.7 | 35.8 |
| 95th male | 225.5 | 12.8 | 18.0 | 22.1 | 25.5 | 28.5 | 31.2 |
| | | \multicolumn{6}{c}{US population} | | | | | |
| Male | | | | | | | |
| 5th | 135.3 | 16.5 | 23.3 | 28.5 | 32.9 | 36.8 | 40.3 |
| 50th | 189.4 | 13.9 | 19.7 | 24.1 | 27.8 | 31.1 | 34.1 |
| 95th | 273.0 | 11.6 | 16.4 | 20.1 | 23.2 | 25.9 | 28.4 |
| Female | | | | | | | |
| 5th | 110.4 | 18.2 | 25.8 | 31.6 | 36.5 | 40.8 | 44.7 |
| 50th | 156.9 | 15.3 | 21.6 | 26.5 | 30.6 | 34.2 | 37.5 |
| 95th | 250.4 | 12.1 | 17.1 | 21.0 | 24.2 | 27.1 | 29.7 |

Table 1 summarizes the severity of crash that a seat can accelerate an occupant up to the delta V without rotating beyond 60 deg based on the energy transfer capability of the seat and the weight of the occupant. For example, a seat with 1,474 ft-lb energy transfer capability and 15,000 in-lb moment strength can accelerate a 50th Hybrid III dummy to a delta V of 20.7 mph with up to 60 deg seatback angle rearward of vertical (40 deg change in seatback angle). The weight of crash dummies is from Mertz H J, Irwin A L, Prasad P., Biomechanical and Scaling Basis for Frontal and Side Impact Injury Assessment Reference Values. Stapp Car Crash J. 60:625-657, 2016; and Mertz H J, Jarrett K, Moss S, Salloum M, Zhao Y. The Hybrid III 10-Year-Old Dummy. SAE 2001-22-0014, Society of Automotive Engineers, Warrendale, Pa., 2001. The same seat can bring a 95th US population male weighing 273 lb up to a 16.4 mph crash. The weight of the US population is from Fryar C D, Gu Q, Ogden C L. Anthropometric reference data for children and adults: United States, 2007-2010. National Center for Health Statistics. Vital Health Stat 11(252). 2012. More energy transfer capability is needed with heavier occupants that is why the range of crashes they can be accelerated up to with 60 deg seatback angle is lower than for the 50th Hybrid III dummy that weighs 172 lb.

If the goal is to accelerate the 95th US male up to 28.4 mph in a rear crash, the seat needs an energy transfer capability of 4,422 ft-lb and moment strength of 45,000 in-lb. However, there is a downside to making the seat recliners and structures that strong. The increased structure stiffens the seat and increases risk for injury to occupants in low-to-moderate speed rear crashes where yielding lessens the forces on the occupant (See Viano D C, Parenteau C S. Serious Injury in Very-Low and Very-High Speed Rear Impacts. SAE 2008-01-1485, Society of Automotive Engineers, Warrendale Pa., 2008). The trade-off is stiffening the seat for a very rare high-speed crash with a heavy occupant, which improves occupant retention, or lessening the forces in lower speed crashes, which often involve older occupants and individuals with spinal disorders who have lower tolerances to load. Since 71% of rear crashes are less than 15 mph and less than 5% are more severe than 25 mph delta V, the tradeoff overwhelmingly favors yielding seats of moderate strength that lower forces on the occupant but have limitations in high speed rear crashes (See Viano D C, Parenteau C S, Burnett R, Prasad P. Occupant Responses in Conventional and ABTS Seats in High-Speed Rear Sled Tests with a Normally Seated Dummy. Traffic Injury Prevention, 2; 19(1):54-59, 2018).

An alternative approach is needed for the infrequent, very severe rear impacts, rather than further strengthening the recliners and seat structures to resist rotation. The present disclosure aims to transfer the load on the seatback in a severe rear impact from the recliners to the seat cushion structure and floor, thus avoiding the significant rotation forces on the recliners and seatback in a severe rear impact with a heavy occupant.

The present disclosure provides a safety assembly that inhibits an occupant from moving up the vehicle seat during a severe rear vehicle impact by providing a load path that bypasses the recliners and seatback frame and is directed towards the floor of the vehicle, through the cushion frame, to inhibit or prevent the yielding of the recline mechanism. The safety assembly provides a second generation pelvic strap that attaches to the cushion frame and/or floor. The safety assembly may also provide restraint to an occupant's torso, such as the pelvis, back, or parts of the upper body including an occupants head and neck.

Figure 1:
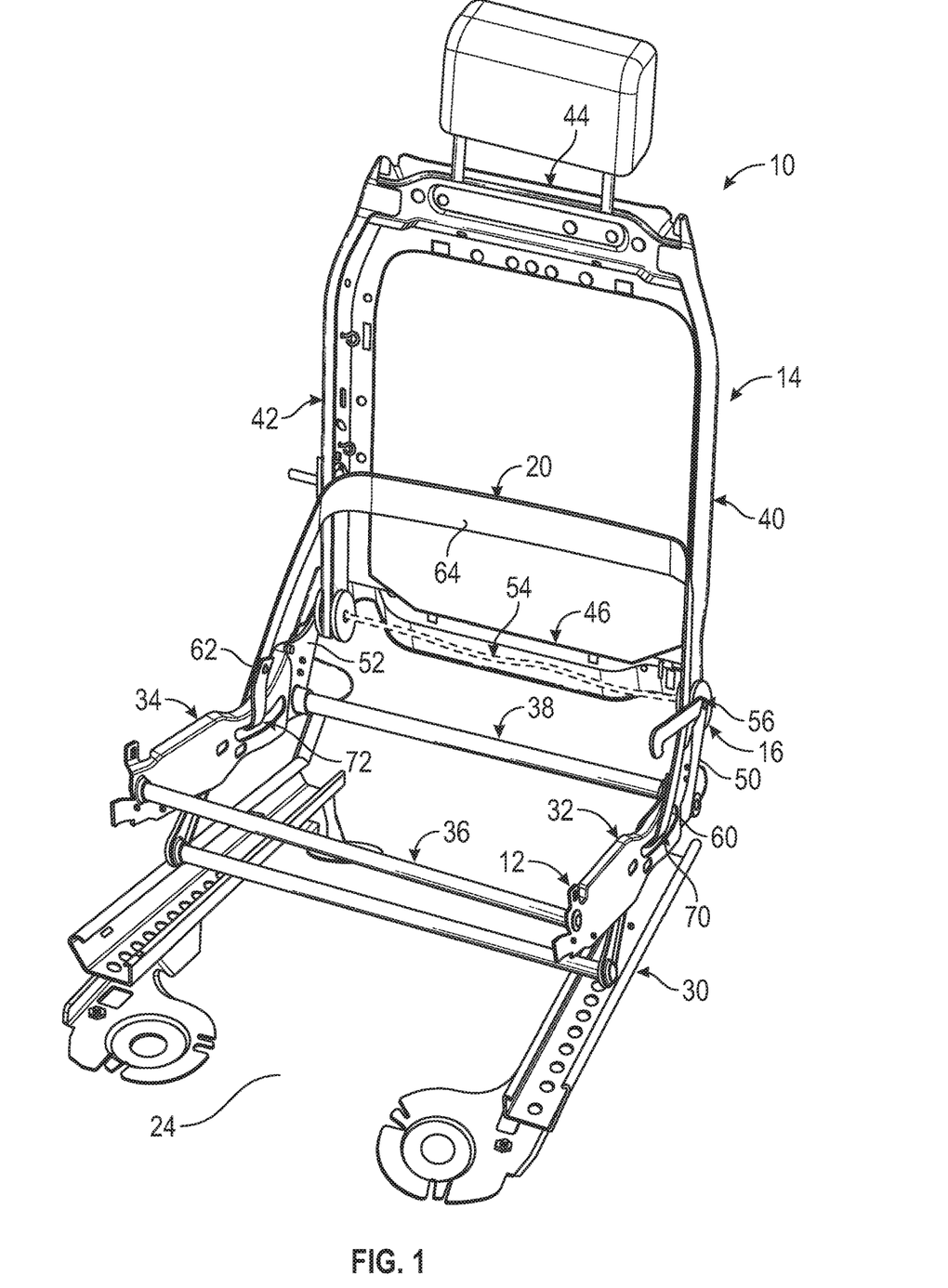
FIG. 1 is a perspective view of a vehicle seat frame according to a first embodiment.
Figure 2A:
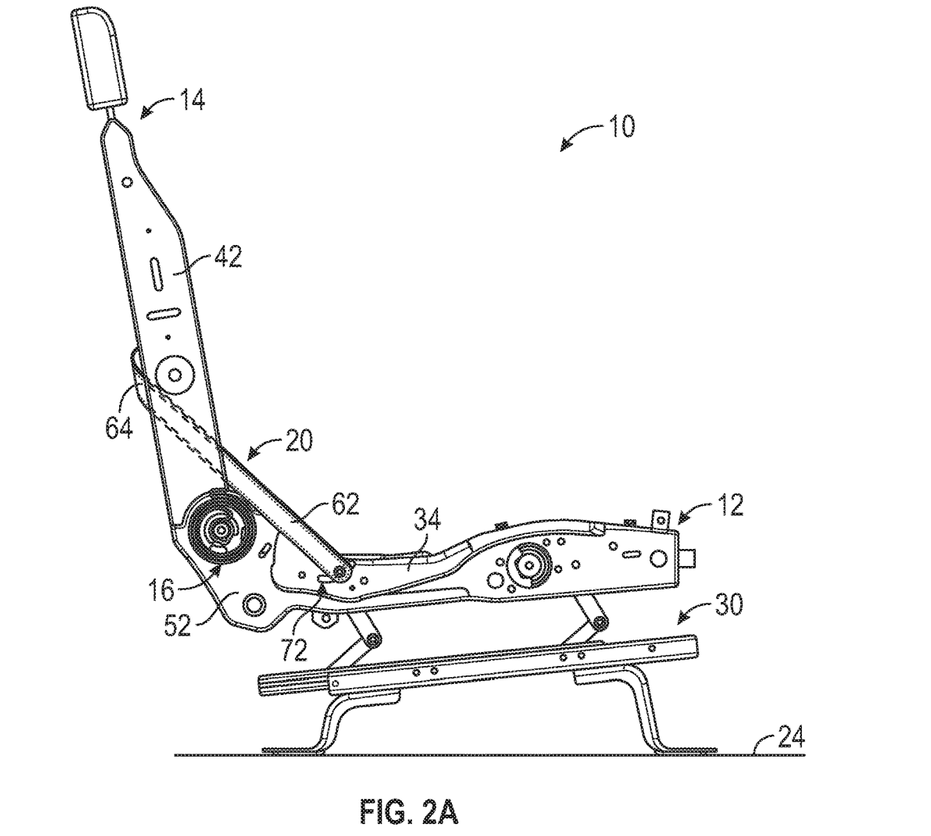
FIG. 2A is a side view of the vehicle seat frame of FIG. 1.
Figure 2B:
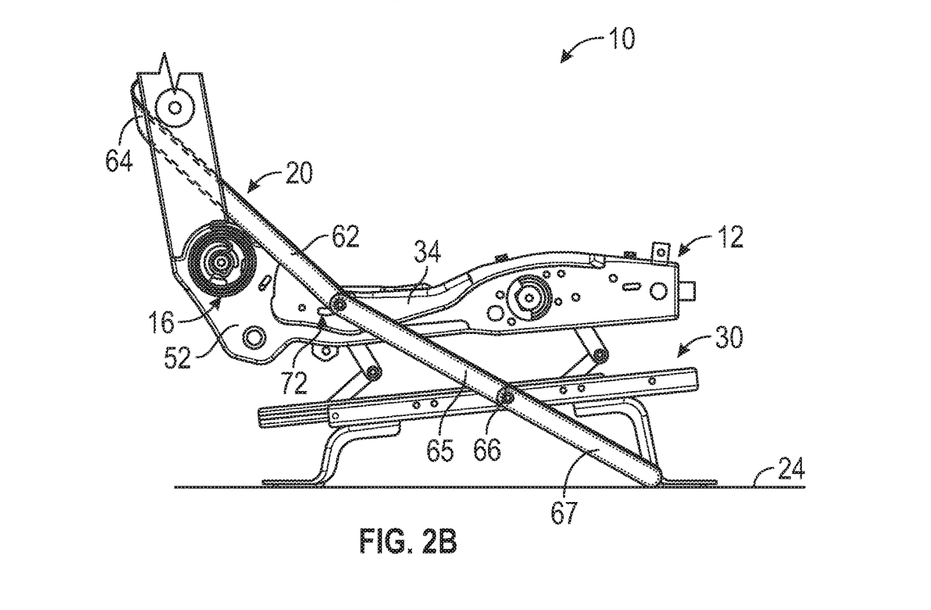
FIG. 2B is a side view of the vehicle seat frame of FIG. 1.
Figure 3:
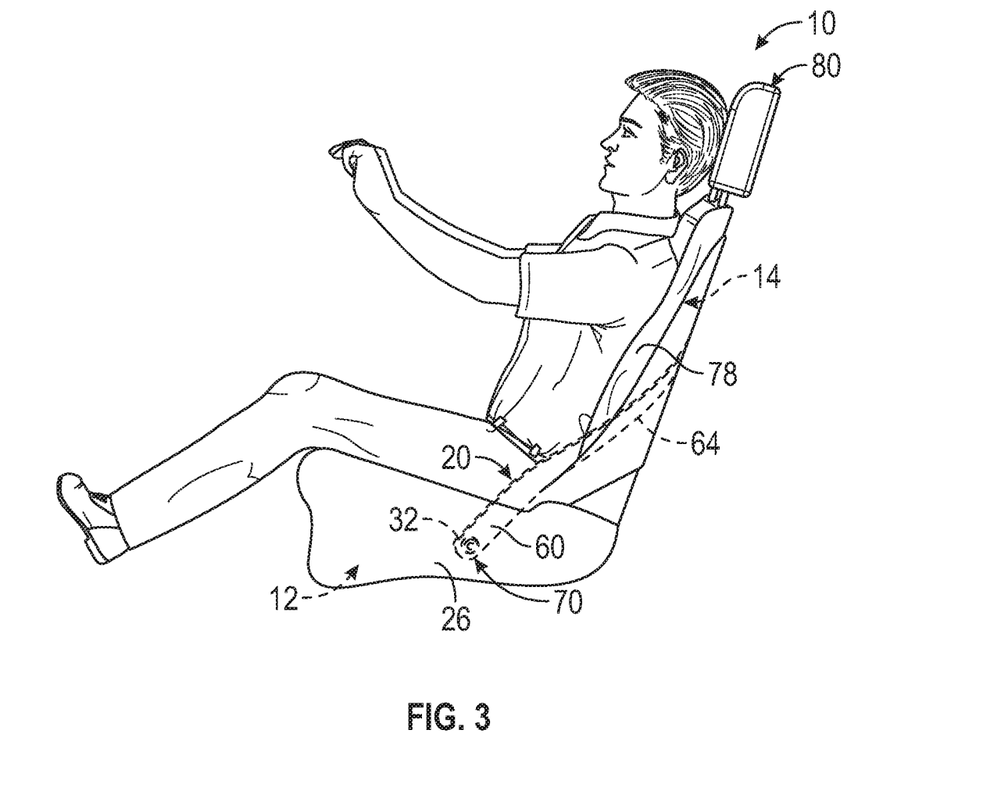
FIG. 3 is a side view of a complete vehicle seat showing a pelvic restraining strap capturing the pelvic region of an occupant.
Figure 4:
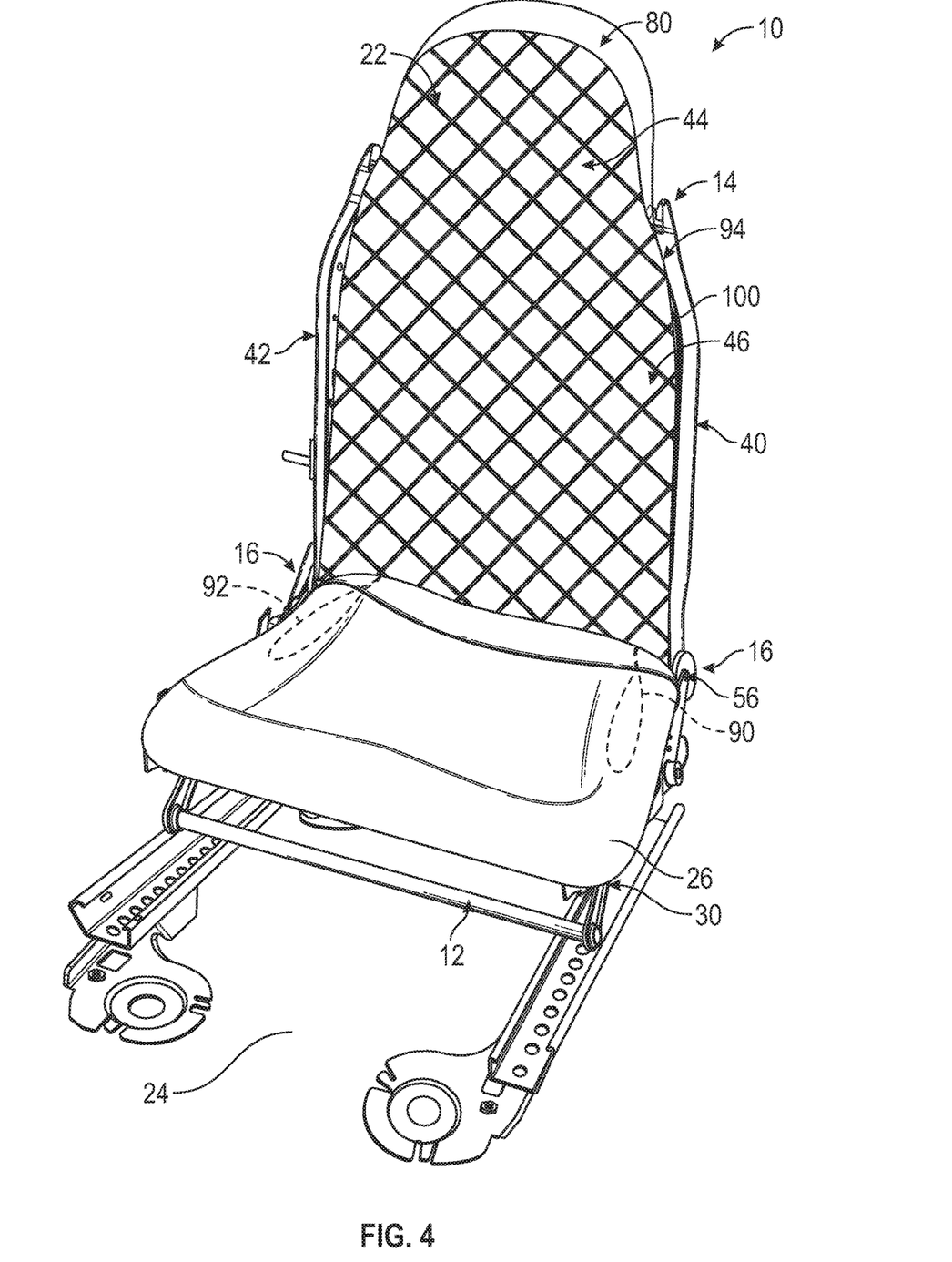
FIG. 4 is a perspective view of a vehicle seat having a portion of the seat trim removed according to a second embodiment.
Figure 5A:
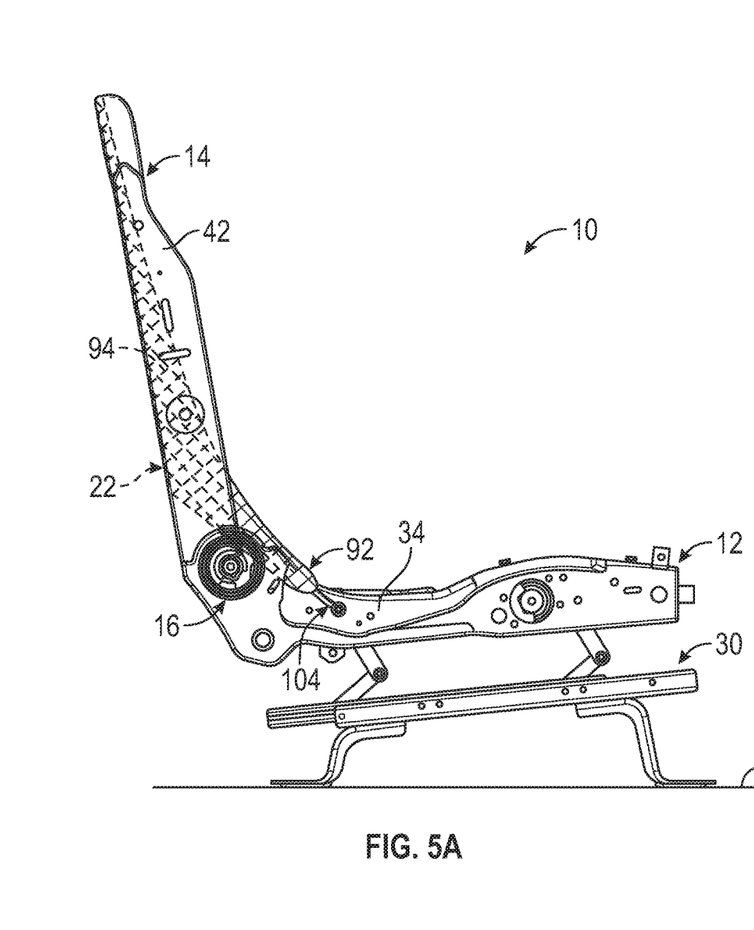
FIG. 5A is a side view of the vehicle seat of FIG. 4.
Figure 5B:
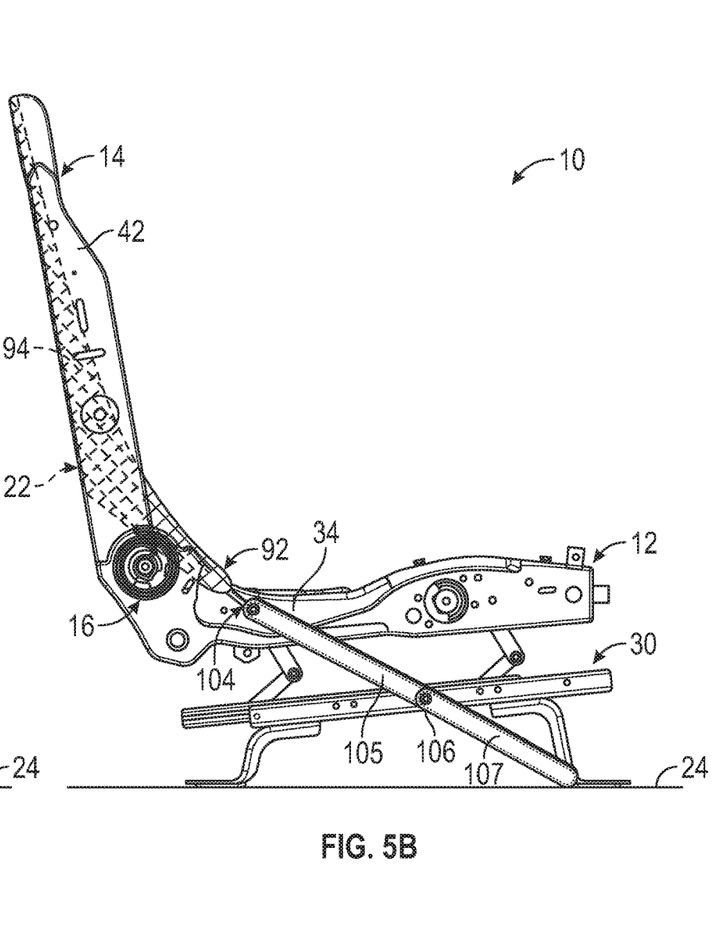
FIG. 5B is a side view of the vehicle seat of FIG. 4.
Figure 5C:
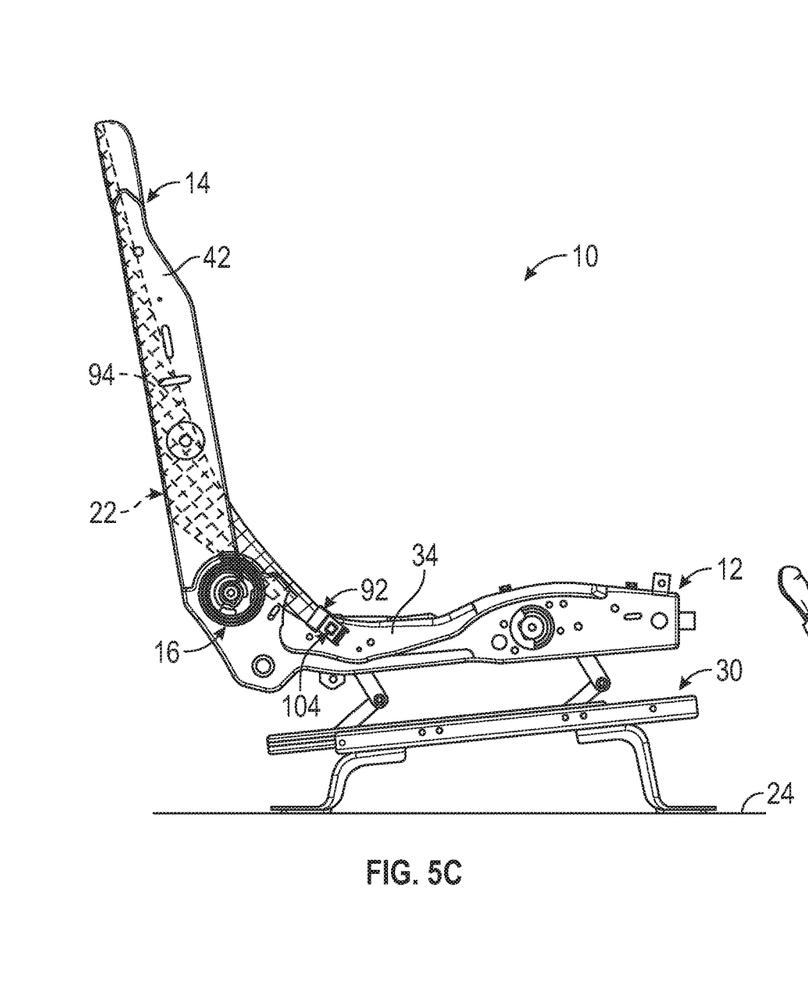
FIG. 5C is a side view of the vehicle seat of FIG. 4.
Figure 6:
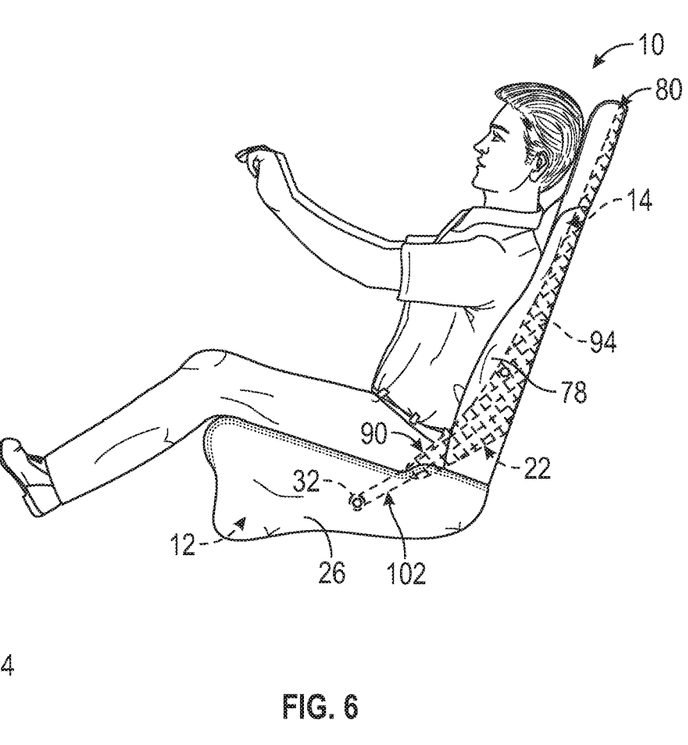
FIG. 6 is a side view of the vehicle seat with the seat trim included, showing a restraining member capturing the torso, head, and back of an occupant.

Referring to FIGS. 1-3, a vehicle seat 10 is shown. The vehicle seat 10 includes a cushion frame 12, a seatback frame 14, a recliner mechanism 16 that pivotally connects the seatback frame 14 to the cushion frame 12, and a safety assembly that may be a wrap-around strap or a pelvic restraining strap 20, as shown in FIGS. 1-3, or may be a restraining member 22, as shown in FIGS. 4-6.

The cushion frame 12 is secured to a vehicle floor 24 through a mounting assembly 30. The mounting assembly 30 may facilitate fore and aft adjustment of the vehicle seats 10 relative to the vehicle structure or in some embodiments simply secure the vehicle seat 10 to the vehicle floor 24 without facilitating adjustment. Cushion trim 26 is disposed about portions of the cushion frame 12, as shown in FIG. 3. The lower extremities of an occupant, such as the thigh region and pelvic region, are arranged to be disposed on the cushion trim 26 and supported by the cushion frame 12 and vehicle floor 24.

The cushion frame 12 includes a first side member 32, a second side member 34 that is disposed opposite the first side member 32, a front cross member 36, and a rear cross member 38. The front cross member 36 extends between distal ends of the first side member 32 and the second side member 34. The rear cross member 38 extends between proximal ends of the first side member 32 and the second side member 34. The front cross member 36 and the rear cross member 38 connect the first side member 32 and the second side member 34 together to define a rigid cushion frame 12.

The seatback frame 14 includes a first side rail 40, a second side rail 42 that is disposed opposite the first side rail 40, a first seatback cross member 44 extending between distal ends of the first side rail 40 and the second side rail 42, and a second seatback cross member 46 extending between the first side rail 40 and the second side rail 42. The first side rail 40 is connected to the first side member 32 through the recliner mechanism 16 or may be directly connected to the first side member 32. The second side rail 42 is connected to the second side member 34 to the recliner mechanism 16 or may be directly connected to the second side member 34. The first seatback cross member 44 may be integrally formed with the first side rail 40 and the second side rail 42 such that the first seatback cross member 44, the first side rail 40, and the second side rail 42 define a generally U-shaped frame member. The second seatback cross member 46 extends between the first side rail 40 and the second side rail 42. The second seatback cross-member 46 is deformable rearward under occupant load during a vehicle impact. In at least one embodiment, the second seatback cross member 46 is arranged as a plastically deformable member that is arranged to be deformed rearward during a rear vehicle impact by a portion of an occupant's back.

The recliner mechanism 16 may include a first plate 50, a second plate 52, a connecting rod or a cable 54 (e.g. a Bowden cable), and an actuator 56. The first plate 50 is connected to the first side rail 40 and the first side member 32. The rear cross member 38 may be connected to a first end of the first plate 50. The rod or cable 54 may be connected to or extend through a second end of the first plate 50. Similarly, the second plate 52 is connected to the second side rail 42 and the second side member 34. The rear cross member 38 may be connected to a first end of the second plate 52. The rod or cable 54 may be connected to or extend through a second end of the second plate 52. Should a connecting rod be employed, the connecting rod is deformable rearward under occupant load.

The actuator 56 is connected to the rod or cable 54 and may extend between the first plate 50 and the second plate 52. The actuator 56 is operably connected to the rod or cable 54 such that actuation or movement of the actuator 56 in a first direction may facilitate movement of the seatback frame 14 relative to the cushion frame 12. The actuator 56 is operably connected to the pin or cable 54 such that actuation or movement of the actuator 56 in a second direction may inhibit movement of the seatback frame 14 relative to the cushion frame 12. In some vehicles that employ a power recliner or powered seat adjustment mechanism, the actuator 56 may not be provided.

With continued reference to FIGS. 1-3, the wrap-around strap or the pelvic restraining strap 20 is connected to the cushion frame 12 and extends towards and is disposed between the side rails of the seatback frame 14. The pelvic restraining strap 20 is arranged to be routed or wrapped at least partially around a seated occupant's back, pelvis, or torso. The pelvic restraining strap 20 in contact with the back of the occupant has sufficient size and compliance to distribute loads on the spine of the occupant in a rear impact to inhibit serious injury to the occupant. The pelvic restraining strap 20 is fixed to the cushion frame 12, the vehicle floor 24, or the mounting assembly 30 to provide a direct connection between the occupant and the vehicle floor 24 (via the mounting assembly 30) during a rear impact. Referring to FIG. 2B, the pelvic retraining strap 20 may alternatively or additionally be connected to at least one of the mounting assembly 30 or the vehicle floor 24.

During a vehicle impact, the pelvic restraining strap 20 decouples a load path from the seatback frame 14 and directs the load path through the cushion frame 12 and to the vehicle floor 24 to inhibit or prevent yielding of the recliner mechanism 16. This inhibits or prevents an occupant from moving off the vehicle seat 10 or moving up the seatback frame 14. Furthermore, during a rear impact the recliner mechanism 16 may resist rearward rotation of the seatback frame 14 relative to the cushion frame 12 and should the pelvic restraining strap 20 be connected to the seatback frame 14, the pelvic restraining strap 20 may also control the rearward rotation of the seatback frame 14 by adding to the resistance from the recliner mechanism 16.

The pelvic restraining strap 20 includes a first strap end 60, a second strap end 62, and a strap body 64 extending between the first strap end 60 and the second strap end 62.

Referring to FIGS. 1, 2A, and 3, the first strap end 60 is connected to the first side member 32. The first strap end 60 may be connected to the first side member 32 through a first locking guide 70. The second strap end 62 is connected to the second side member 34. The second strap end 62 may be connected to the second side member 34 through a second locking guide 72. The first locking guide 70 and/or the second locking guide 72 are arranged to facilitate or permit the movement of at least one of the seatback frame 14 and the pelvic restraining strap 20 relative to the cushion frame 12 to permit reclining of the seatback frame 14 for comfort. In at least one embodiment, the first locking guide 70 and the second locking guide 72 are arranged to allow the pelvic restraining strap 20 to move relative to the cushion frame 12 and/or the seatback frame 14. In such an embodiment, the seatback frame 14 is arranged to recline relative to the cushion frame 12 without the pelvic restraining strap 20 interfering with the reclining.

In at least one embodiment, the first strap end 60 and the second strap end 62 are directly connected to the vehicle floor 24. As shown in FIG. 2B, a first strap extension 65 extends from the strap body 64 or from at least one of the first strap end 60 and the second strap end 62. The first strap extension 65 may be connected to the mounting assembly 30 at a first connection 66. A second strap extension 67 may extend from the first strap extension 65 proximate the first connection 66 and connect to the vehicle floor 24 or to the vehicle floor 24 and a portion of the mounting assembly 30. The extensions 65, 67 are shown as links, but may be a mechanism, linkage system or components that control and directs the forces in the wrap-around strap 20 to the seat and vehicle structures to restrain the rearward movement of the occupant.

The strap body 64 is disposed between and is spaced apart from the first side rail 40 and the second side rail 42 of the seatback frame 14. The strap body 64 may or may not be connected to the first side rail 40 and the second side rail 42 of the seatback frame 14. If connected, load in the strap 20 restrains the rearward movement of the occupant and resists seatback rotation. The connection to the first side rail 40 and the second side rail 42 of the seatback frame 14 may be load limiting to balance occupant restraint and seatback rotation. There are situations where the occupant is out-of-position and does not load centrally on the seatback. In these cases, which often involve oblique or offset rear impacts or impacts with rear override by the striking vehicle, the head, neck and/or upper body of the occupant moves rearward and may not be supported by the seatback. Only a portion of the torso of the occupant may be restrained by the seatback and with high-strength seats, the loads on the thoracic or cervical spine of the occupant may exceed tolerance with fractures of the spine and spinal cord injury (see Viano D C. Fracture-Dislocation of the Thoracic Spine in Extension with Upright Seats in Severe Rear Crashes. SAE 2011-01-0274, Society of Automotive Engineers, Warrendale Pa., 2011). For these situations, a yielding seatback lowers forces on the spine and reduces the risk of serious injury. With a wrap-around pelvis strap 20, the seatback frame 14 and recliner mechanism 16 may be tuned in strength for a balance of protection over a range of crash speeds, occupant sizes and seating positions. The wrap-around strap 20 serves as the primary restraint for the most severe rear impacts and heaviest occupants.

The strap body 64 extends towards at least one of the seatback cross members 44, 46. The strap body 64 extends in a direction that extends away from the front cross member 36 and towards the rear cross member 38 and is disposed in a non-perpendicular non-parallel relationship with respect to the cushion frame 12 and the seatback frame 14.

The strap body 64 may have a height or width that is greater than a height or width of the first strap end 60 and the first strap end 62. The widest portion of the strap body 64 is in the plane of the seatback 14 and faces the back of a seated occupant to restrain the rearward movement of the occupant.

Responsive to or during a rear vehicle impact in which an occupant load is applied to the strap body 64 of the pelvic restraining strap 20, a load path is directed to the cushion frame 12 and ultimately to the vehicle floor. This load path bypasses the seatback frame 14 and the recliner mechanism 16, thus facilitating the retention of an operator within the vehicle seat 10 as well as reducing overall weight and cost of the vehicle seat 10. The strap body 64 of the pelvic restraining strap 20 is allowed to plastically deform to absorb energy during the rear vehicle impact. The strap body 64 may have various configurations as well as be constructed of various materials such as a metal, woven fabrics, plastic, or the like that is arranged to plastically deform to absorb energy.

The combination of the lap belt (not shown) and the pelvic restraining strap 20 provide a restraint system that wraps about the abdomen or pelvic region of an occupant of the vehicle seat 10; even a $95^{th}$ percentile male that may occupy the vehicle seat 10.

Referring to FIGS. 4-6, in an embodiment, a restraining member 22 may be provided instead of the pelvic restraining strap 20 or may be provided along with the pelvic restraining strap 20. The restraining member 22 may be configured as a back retention net or a back retention mesh that is integrated into a seatback trim 78, as shown in FIG. 6. In some embodiments, the restraining member 22 may extend into and be integrated with a head rest or a head restraint 80 connected to the seatback frame 14. The head restraint 80 may be an adjustable head restraint or a non-adjustable, integrated head restraint. The restraining member 22 is arranged to provide support to a vehicle occupant's pelvis, torso, neck and head, or an occupant's entire body during a rear vehicle impact.

The restraining member 22 includes a first end 90, a second end 92, and a restraining member body 94 that is connected to the first end 90 and the second end 92. The first end 90 is connected to the first side member 32. The second end 92 is connected to the second side member 34. In at least one embodiment, the first end 90 and the second end 92 are integrated into a cushion trim that is disposed about the cushion frame 12, as shown in FIG. 4. The restraining member body 94 is at least partially disposed between the first side rail 40 and the second side rail 42. The restraining member body 94 is integrated into a seatback trim that is disposed about the seatback frame 14 and is spaced apart from the seatback frame 14.

A cable assembly or a tension assembly may be provided that extends about an outer perimeter of the restraining member body 94, as shown in FIG. 4. The tension assembly may provide a variable or adjustable level of tension to the restraining member 22. The tension assembly includes a first tension member 102 and a second tension member 104. The first tension member 102 extends between the first end 90 and the first side member 32, to connect the first end 90 to the first side member 32, as shown in FIG. 6. The second tension member 104 extends between the second end 92 and the second side member 34 to connect the second end 92 to the second side member 34, as shown in FIG. 5A.

The first tension member 102 and the second tension member 104 may be cables or straps that provide an adjustable level of tension to the restraining member body 94 by adjusting a distance between a respective end of the restraining member 22 and the cushion frame 12. As shown in FIG. 5C, the first tension member 102 is detachably connected to the first side member 32 and the second tension member 104 is detachably connected or releasably connected to the second side member 34. The point of detachment may be anywhere to ease assembly of the vehicle seat.

In at least one embodiment, the first tension member 102 and the second tension member 104 are connected to the vehicle floor 24. As shown in FIG. 5B, a first extension 105 extends from the restraining member 22 or from at least one of the first tension member 102 and the second tension member 104. The first extension 105 may be connected to the mounting assembly 30 at a first connection 106. A second extension 107 may extend from the first extension 105 proximate the first connection 106 and connect to the vehicle floor 24 or to the vehicle floor 24 and a portion of the mounting assembly 30.

Responsive to or during a rear vehicle impact in which an occupant load is applied to restraining member body 94 of the restraining member 22, a load path is directed to the cushion frame 12 through the first end 90 and the first tension member 102 as well as through the second end 92 and the second tension member 104 and ultimately to the vehicle floor 24. This load path reduces loading on the seatback frame 14 and the recliner mechanism 16, thus facilitating the retention of an operator within the vehicle seat 10 as well as reducing overall weight and cost of the vehicle seat 10 due to the use of lighter frame materials while satisfying vehicle impact requirements.

The pelvic restraining strap 20 and the restraining member 22 distribute loads on the occupant to provide greater restraint of the occupant's torso during a rear vehicle impact. The pelvic restraining strap 20 and the restraining member 22 allow an occupant of the vehicle seat to be pocketed and restrained by the pelvic restraining strap 20 and the restraining member 22. The pelvic restraining strap 20 and the restraining member 22 are arranged to restrain even very heavy occupants during a rear vehicle impact.

The pelvic restraining strap 20 may be connected to the seat cushion frame 12, the vehicle floor 24, or the mounting assembly 30. through a pre-tensioning device (not shown) that acts on at least one of the first strap end 60 and the second strap end 62 to tighten the pelvic restraining strap 20 in a rear impact, providing earlier and greater transfer of the occupant load to the seat cushion frame 12 and the vehicle floor 24. Similarly, the restraining member 22 may be connected to the seat cushion frame 12 through a pre-tensioning device that acts on the first end 90 and the second end 92 to tighten the restraining member body (net or mesh) 94 around the back of the occupant during a rear impact.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

What is claimed is:

1. A vehicle seat, comprising:
    a cushion frame connected to a vehicle floor, the cushion frame having a first side member and a second side member disposed opposite to the first side member;
    a seatback frame connected to the cushion frame; and
    a pelvic restraining strap having a first strap end connected to at least one of the first side member of the cushion frame and the vehicle floor, a second strap end connected to at least one of the second side member of the cushion frame and the vehicle floor, and a strap body extending between the first strap end and the second strap end, the pelvic restraining strap being arranged to wrap around a portion of at least one of a seated occupant's pelvis and torso, the pelvic restraining strap being connected to the seatback frame and arranged to control a rearward rotation of the seatback frame by adding to a resistance from a rotating mechanism associated with the vehicle seat.

2. The vehicle seat of claim 1, wherein the strap body is disposed between a first side rail and a second side rail of the seatback frame.

3. The vehicle seat of claim 1, wherein the strap body extends from the cushion frame towards the seatback frame.

4. The vehicle seat of claim 1, wherein the seatback frame is movable relative to the cushion frame and the pelvic restraining strap via a recliner mechanism.

5. The vehicle seat of claim 1, wherein responsive to a vehicle impact in which an occupant load that is applied to the strap body, a load path is directed through the cushion frame and to the vehicle floor through the pelvic restraining strap.

6. The vehicle seat of claim 1, further comprising:
    a first locking guide arranged to connect the first strap end to the first side member.

7. The vehicle seat of claim 6, further comprising:
    a second locking guide arranged to connect the second strap end to the second side member.

8. The vehicle seat of claim 7, wherein the first locking guide and the second locking guide facilitate movement of at least one of the seatback frame and the pelvic restraining strap relative to the cushion frame to permit reclining of the seatback frame for comfort.

9. The vehicle seat of claim 1, wherein the pelvic restraining strap is connected to the seatback frame and is arranged to control rearward rotation of the seatback frame by adding to resistance from a recliner associated with the vehicle seat.

10. A vehicle seat, comprising:
    a cushion frame having a first side member and a second side member;
    a seatback frame connected to the cushion frame; and
    a restraining member having a first end connected to at least one of the first side member and a vehicle floor, a second end connected to at least one of the second side member and the vehicle floor, and a restraining member body connected to the first end and the second end, the restraining member body extending into the seatback frame, the restraining member being integrated with a seatback trim and arranged to control a rearward rotation of the seatback frame by adding to a resistance from a rotating mechanism associated with the vehicle seat.

11. The vehicle seat of claim 10, wherein the restraining member is a back retention net integrated into a seatback trim.

12. The vehicle seat of claim 10, further comprising:
    a head restraint at least one of connected to and integrated with the seatback frame.

13. The vehicle seat of claim 12, wherein the restraining member body extends into the head restraint.

14. The vehicle seat of claim 13, wherein the restraining member is arranged to provide support to a vehicle occupant's pelvis, torso, neck, and head during a rear vehicle impact.

15. The vehicle seat of claim 10, further comprising a tension assembly, including:
    a first tension member extending between the first end and the first side member; and
    a second tension member extending between the second end and the second side member.

16. The vehicle seat of claim 15, wherein at least one of the first tension member and the second tension member is at least one of a cable and a strap.

17. The vehicle seat of claim 15, wherein the first tension member is detachably connected to the first side member and the second tension member is detachably connected to the second side member.

* * * * *